US00RE44347E

(19) United States
(12) Reissued Patent
Schmittler et al.

(10) Patent Number: US RE44,347 E
(45) Date of Reissued Patent: Jul. 9, 2013

(54) METHOD AND DEVICE FOR CREATING A TWO-DIMENSIONAL REPRESENTATION OF A THREE-DIMENSIONAL STRUCTURE

(75) Inventors: Jörg Schmittler, Saarbrücken (DE); Ingo Wald, Salt Lake City, UT (US); Philipp Slusallek, Saarbrücken (DE)

(73) Assignee: Jordaan Consulting Ltd, V, LLC, Wilmington, DE (US)

(21) Appl. No.: 12/608,864

(22) Filed: Oct. 29, 2009 (Under 37 CFR 1.47)

Related U.S. Patent Documents

Reissue of:
(64) Patent No.: 7,289,118
Issued: Oct. 30, 2007
Appl. No.: 10/526,055
PCT Filed: Aug. 20, 2003
PCT No.: PCT/DE03/02801
§ 371 (c)(1),
(2), (4) Date: Sep. 19, 2005
PCT Pub. No.: WO2004/021274
PCT Pub. Date: Mar. 11, 2004

(30) Foreign Application Priority Data

Aug. 26, 2002 (DE) ..... 102 39 672

(51) Int. Cl.
*G06T 15/00* (2006.01)
*G06T 15/50* (2006.01)
*G06T 15/60* (2006.01)

(52) U.S. Cl.
USPC ..... 345/423; 345/426; 345/419

(58) Field of Classification Search
USPC ..... 345/419, 426
See application file for complete search history.

(56) References Cited

U.S. PATENT DOCUMENTS

| | | | | |
|---|---|---|---|---|
| 5,305,430 | A | 4/1994 | Glassner | |
| 5,594,844 | A * | 1/1997 | Sakai et al. | 345/427 |
| 5,933,146 | A | 8/1999 | Wrigley | |
| 6,088,035 | A * | 7/2000 | Sudarsky et al. | 345/421 |
| 6,111,582 | A | 8/2000 | Jenkins | |
| 6,302,541 | B1 | 10/2001 | Grossmann | |
| 6,538,651 | B1 * | 3/2003 | Hayman et al. | 345/419 |
| 6,556,200 | B1 * | 4/2003 | Pfister et al. | 345/426 |
| 6,587,110 | B1 * | 7/2003 | Kunimatsu et al. | 345/502 |
| 6,597,359 | B1 | 7/2003 | Lathrop | |
| 6,664,961 | B2 * | 12/2003 | Ray et al. | 345/424 |
| 6,868,420 | B2 * | 3/2005 | Perry et al. | 707/743 |
| 7,012,604 | B1 | 3/2006 | Christie et al. | |
| 7,164,420 | B2 | 1/2007 | Ard | |

(Continued)

FOREIGN PATENT DOCUMENTS

| | | |
|---|---|---|
| DE | 4417664 | 12/1994 |
| DE | 4331715 A1 | 3/1995 |

(Continued)

OTHER PUBLICATIONS

Arnaldi et al.; A new space subdivision method for ray tracing CSG modelled scenes; Aug. 1987; Springer Berlin; The Visual Computer, vol. 3, No. 2; pp. 98-108.*

(Continued)

*Primary Examiner* — David T Welch
(74) *Attorney, Agent, or Firm* — Schwabe, Williamson & Wyatt, P.C.

(57) ABSTRACT

The invention relates to a method and a device for two-dimensionally representing a three-dimensional world, in which rays are combined into packets during ray tracing, and said packets of rays are processed in adequate steps.

16 Claims, 3 Drawing Sheets

U.S. PATENT DOCUMENTS

Figure 1:
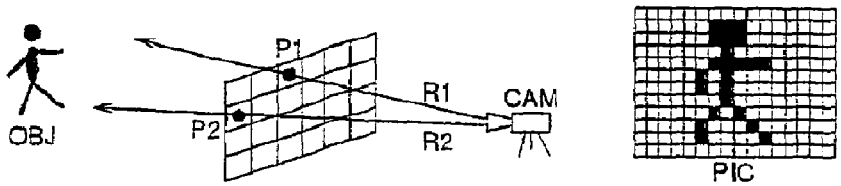

| | | | | |
|---|---|---|---|---|
| 2002/0140703 | A1* | 10/2002 | Baker et al. | 345/582 |
| 2003/0160788 | A1 | 8/2003 | Buehler | |
| 2003/0165254 | A1* | 9/2003 | Chen et al. | 382/103 |
| 2004/0233222 | A1 | 11/2004 | Lee et al. | |
| 2008/0043018 | A1* | 2/2008 | Keller et al. | 345/426 |

FOREIGN PATENT DOCUMENTS

| | | | |
|---|---|---|---|
| DE | 19737449 | | 2/1999 |
| DE | 19753040 | | 5/1999 |
| DE | 19827590 | | 12/1999 |
| JP | 2000-293709 | A | 10/2000 |
| JP | 2001-092985 | A | 4/2001 |

OTHER PUBLICATIONS

MacDonald et al.; Heuristics for ray tracing using space subdivision; Jun. 1990; Springer-Verlag New York; The Visual Computer, vol. 6, No. 3; pp. 153-166.*

Aruga et al., "A Space Sampling Method for Improving Realism of 3-Dimensional Computer Graphics," PFU Technical Review, PFU, Aug. 1, 1995, vol. 6, No. 2, pp. 83-92.

Final Office Action issued Feb. 23, 2011 from Japanese Application No. 2006-552460.

Document No. 6,111,582, Jenkins, Office Action of the German PTO dated Aug. 2000.

Hook, David G. Algorithms for Accelerating Ray Tracing. May 29, 1995. http://72.14.209.104/search?q=cache:asx_I3iRcaoJ:bund.com.au/~dgh/HookMAppScThesis.ps.gz+algorithm+for+accelerating+ray+tracing&hl=en&ct=clnk&cd=5&gl=us.

Normand Brière and Pierre Poulin: "Hierarchical View-dependent Structures for Interactive Scene Manipulation," SIGGRAPH 96, New Orleans, Louisiana, Aug. 1996.

Arthur Appel: "Some Techniques for Shading Machine Renderings of Solids," Proceedings of "AFIPS 1968 Spring Joint Computer Conference," vol. 32, pp. 37-45 (German Priority Document & Spec) Enclosed.

Andrew S. Glassner (Editor): "An Introduction to Ray Tracing," Academic Press, ISBN 0-12-286160-4. (German Priority Document & Spec) Enclosed 1989.

Ingo Wald, Carsten Benthin, and Philipp Slusallek: "A Simple and Practical Method for Interactive Ray Tracing of Dynamic Scenes," Technical Report Apr. 2002, submitted for publication, http://graphics.cs.uni-sb.de/Publications/TR/2002/Dyn/DynamicRayTracing.pdf. (German Priority Document & Spec) Enclosed.

Wald et al: "Interactive Rendering with Coherent Ray Tracing" European Association for Computer Graphics. 22nd Annual Conference Eurographics 2001, Manchester Uk, Sep. 4-7, 2001, vol. 20, No. 3, pp. C/53-64, XP002269801 Computer Graphics Forum, 2001, Blackwell Publishers for Eurograpean Assoc, UK ISSN: 0167-7055 (International Search Report).

Lext, J. et al: "Towards Rapid Reconstruction for Animated Ray Tracing" Eurographics 2001 Short Presentations, 2001, pp. 311-318, XP002269802 (International Search Report).

Watt: A.: "3D Computer Graphics" 2000, Addison-Wesley, Harlow, England XP002269804 Kapitol 12, p. 358, Line 16, pp. 365, line 4 (International Search Report)Line.

Reinhard E et al: "Dynamic acceleration structures for interactive ray-tracing" Rendering Techniques 2000, Proceedings of the Eurographics Workshop, BRNO, Czech Republic, Jun. 26-28, 2000, pp. 299-306, XP002269803 (International Search Report).

I. Wald, Ph. Slusallek "State of the Art in Interactive Ray Tracing" Quelle: www.openrt.de/Publications (German Office Action) Enclosed.

Japanese Decision to Grant issued May 24, 2011 from Japanese Application No. 2006-552460, mailed May 26, 2011.

Foley et al., "Computer Graphics Principles and Practice: 16.12 Recursive Ray Tracing," Computer Graphics, Principles and Practice, Reading, Addison Wesley, US 1996, pp. 776-792.

Foley et al., "Computer Graphics Principles and Practice," Computer Graphics, Principles and Practice, Reading, Addison Wesley, US 1996, pp. 649-720.

Clark, J.H., "Hierarchical Geometric Models for Visible Surface Algorithms," Communications of the Association for Computing Machinery, vol. 19, No. 10, 1 Oct. 1976, pp. 547-554, New York, US.

Wald et al., "A Simple and Practical Method for Interactive Ray-Tracing of Dynamic Scenes," Technical Report 2002-04, submitted for publication, http://graphics.cs.uni-sb.de/Publications/TR/2002/Dyn/DynamicRayTracing.pdf.

Fender et al., "A High-Speed Ray Tracing Engine Built on a Field-Programmable System," Proceedings. 2003 IEEE International Conference on Field-Programmable Technology (FPT) (IEEE Cat. No. 03EX798), Dec. 15-17, 2003, IEEE Xplore, pp. 188-195.

Goldsmith et al., "Automatic Creation of Object Hierarchies for Ray Tracing," IEEE CG&A, pp. 14-20, California Institute of Technology Synchrotron Laboratory 206-49, Pasadena, California, 1987.

ISR mailed Mar. 2, 2004 from WO2004/021274 A2.

ISR mailed Jun. 21, 2005 from WO2005/078665 A1.

EP Office Action issued Mar. 17, 2010 from EP Application No. 03790730.0.

Kurachi, "Graphics Hardware Performing A Ray Tracing With a Hardware," CG World, Japan, Works Corporation, Dec. 1, 2002, vol. 52, p. 116-119.

Hirata et al, "An Elementary Processor Architecture with Parallel Instruction Issuing from Multiple Threads," Transactions of Information Processing Society of Japan, Japan, Information Processing Society of Japan, Apr. 15, 1993, vol. 34, No. 4, pp. 595-605.

Onoue et al., "A Rendering Method on Desert Scenes of Dunes with Wind-Ripples," Transaction of IEICE, Japan IEICE, Feb. 1, 2003, vol. J86-D-II, No. 2, pp. 282-289.

Kanazawa et al., "A CG Model of Illuminated Volume By Spotlight," IEICE Technical Report, Japan, IEICE, Mar. 12, 1998, vol. 97, No. 597, pp. 7-13.

Office Action mailed Nov. 22, 2006 from U.S. Appl. No. 10/526,055.

Notice of Allowance mailed Jun. 29, 2007 from U.S. Appl. No. 10/526,055.

Office Action mailed Jan. 27, 2009 from U.S. Appl. No. 10/589,794.

Final Office Action mailed Aug. 31, 2009 from U.S. Appl. No. 10/589,794.

Office Action mailed Nov. 27, 2009 from U.S. Appl. No. 10/589,794.

Final Office Action mailed May 24, 2010 from U.S. Appl. No. 10/589,794.

Schmittler et al., "A virtual memory architecture for real-time ray tracing hardware," Computers and Graphics, Pergamon Press Ltd., Oxford, GB, vol. 27, No. 5, Oct. 2003, pp. 693-699.

Schmittler et al., "SaarCOR-A Hardware for Ray Tracing," Proceedings of Eurographics Hardware 2002, Sep. 1, 2002, pp. 27-36.

Wald et al., "Distributed Interactive Ray Tracing of Dynamic Scenes," Parallel and Large-Data Visualization and Graphics, PVG 2003, IEEE Symposium on Oct. 20-21, 2003, pp. 77-85, Piscataway, NJ, USA.

Rubin et al., "A 3-Dimensional Representation for Fast Rendering of Complex Scenes," Siggraph 1980 Conference Proceedings, Seventh Annual Conference on Computer Graphics and Interactive Techniques Jul. 14-18, 1980, vol. 14, No. 3, pp. 110-116, Seattle, WA, USA.

Notice of Allowance mailed Oct. 11, 2011 for U.S. Appl. No. 10/589,794.

Ingo Wald, Carsten Benthin and Phillip Slusallek: "A Simple and Practical Method for Interactive Ray Tracing of Dynamic Scenes," Technical Report Apr. 2002, submitted for publication, http://graphics.cs.uni-sb.de/ Publications/TR/2002/Dyn/DynamicRay/Tracing.pdf. (German Priority Document & Spec) Enclosed.

Wald I et al: "Interactive Rendering with Coherent Ray Tracing" European Association for Computer Graphics. 22nd Annual Conference Eurographics 2001, Manchester Uk, Sep. 4-7, 2001, vol. 20, No. 3, pp. C/53-64, XP002269801 Computer Graphics Forum, 2001, Blackwell Publishers for Eurograpean Assoc, UK ISSN: 0167-7055 (International Search Report).

* cited by examiner

METHOD AND DEVICE FOR CREATING A TWO-DIMENSIONAL REPRESENTATION OF A THREE-DIMENSIONAL STRUCTURE

Matter enclosed in heavy brackets [ ] appears in the original patent but forms no part of this reissue specification; matter printed in italics indicates the additions made by reissue.

*More than one reissue application has been filed for the reissue of U.S. Pat. No. 7,289,118. The reissue applications are the present application Ser. No. 12/608,864, filed Oct. 29, 2009, and reissue application Ser. No. 13/898,265, filed May 20, 2013. The reissue application filed May 20, 2013 is a divisional reissue application of present reissue application Ser. No. 12/608,864.*

CROSS REFERENCE TO RELATED APPLICATIONS

Applicants claim priority under 35 U.S.C. §119 of German Application No. 102 39 672.8 filed Aug. 26, 2002. Applicants also claim priority under 35 U.S.C. §365 of PCT/DE2003/002801 filed Aug. 20, 2003. The international application under PCT article 21(2) was not published in English.

Such a method and such a device relate to a method and a device for generating a two-dimensional representation of a three-dimensional world. The invention particularly relates to the generation of images using the method of ray tracing, which is known colloquially among persons skilled in the art as "ray tracing."

In computer technology, three-dimensional bodies, components, devices, houses, or even worlds are specified by means of geometrical descriptions. These descriptions contain not only the actual geometry but in most cases also data about the materials and light sources. One of the most frequent applications in connection with geometrical descriptions is the generation of a two-dimensional representation of such a three-dimensional description. In this connection, the problems can be clarified as follows:

"If one places a virtual camera in this three-dimensional virtual world and has this camera take a photograph, what would this photograph look like?"

A plurality of methods is already known for solving this problem. One of the best-known ones is the ray tracing method (English: ray tracing). This was first presented, to the inventors' knowledge, in 1968, by Arthur Appel: "Some Techniques for Shading Machine Renderings of Solids," Proceedings of "AFIPS 1968 Spring Joint Computer Conference," Volume 32, pages 37-45, and has been developed further since then by a large number of scientists.

A more detailed discussion of the topic of ray tracing can be found, for example, in Andrew S. Glassner (Editor): "An Introduction to Ray Tracing," Academic Press, ISBN 0-12-286160-4. Additional explanations are found in the description of the figures, in connection with FIG. 1.

The present invention is based on the task of proposing a method as well as a device for implementing the method, with which the generation of a two-dimensional representation of a three-dimensional world is supposed to be simplified. In this connection, resources of a computer are supposed to be utilized more efficiently than was the case with previously known methods.

For a better understanding, the following definitions will be explained in connection with the invention.

The geometrical description of a virtual three-dimensional world contains at least the following components:

One or more objects whose geometry can be specified in different ways.

1. Simple geometrical base bodies, such as triangles, spheres, or blocks
2. Base bodies put together by means of mathematical functions (e.g. combination or intersection)
3. Bodies described by means of mathematical functions, e.g. spine surfaces
4. Bodies described by a data set, e.g. data from a nuclear resonance tomograph A description of the material properties of the objects, such as "object is blue," "object is made of glass," "object possesses a reflective surface." The description of the material properties can also take place, in this connection, by means of numerical parameters or by means of defined calculation regulations.

A tree-like data structure that serves to classify objects of the virtual world according to their spatial location. The term tree-like data structures is used here both for tree structures and for directed acyclic graphs.

In this connection, complex objects can in turn possess a tree-like data structure, which divides the complex object up spatially, or divides it into simpler partial objects, either spatially or logically. In the context of this patent application, no differentiation is made between simple basic objects and complex objects such as composite objects or those having a tree-like structure. Both cases are referred to as "object."

In addition to the properties described above, objects can also possess a transformation. This transformation can describe an affine transformation of the corresponding object in the three-dimensional world, for example using a transformation matrix, and thereby changes the coordinates of the object.

Independent of these transformations, a sequence of instructions can also be specified for an object, in addition. This sequence of instructions can change the properties of the object. This includes the geometrical properties (in the case of a sphere, its radius, for example) and the material properties (its color, for example).

In addition, the lighting situation in the virtual world can also be specified.

The tree-like data structure is composed of the following components:

Tree nodes: Every node in the tree describes the location of an axis-parallel partition plane in the three-dimensional space.

Tree leaf: Each leaf of the datum describes the content of a spatial volume. In this connection, the spatial volume can contain one or more objects, or can also be empty.

Placeholder: A placeholder can stand in place of a tree node, a tree leaf, or an object. A placeholder consists of two parts: A substitute that contains an object, and a substitute object. The substitute object is specified by a sequence of instructions, but can additionally contain objects and tree-like structures and additional placeholders, as well. When the instructions are carried out, new tree nodes, tree leaves, tree edges, objects, and placeholders can be created, which replace the substitute after the instructions have been completely carried out.

Tree edges: These edges represent the connections between the components.

Such tree-like data structures are known in computer technology, but there they consist only of tree nodes, tree leaves, and tree edges. KD trees, which in turn are related to BSP trees, come closest to the present invention. The expansion to include placeholders in connection with ray tracing was discovered within the scope of the present invention. Another integral part of the invention is the compilation of the definition of objects. As a totality that supports and combines all possible properties equally, this definition is new.

Figure 3:
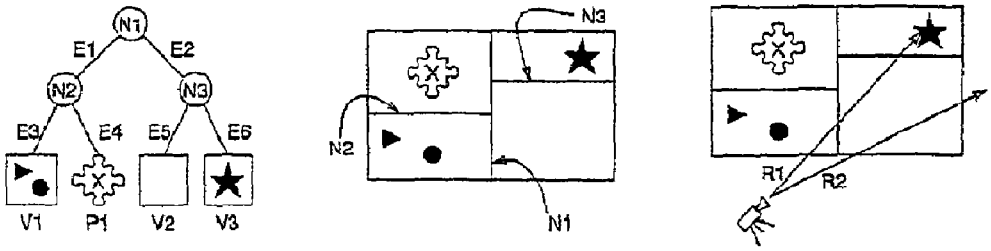

The definitions are explained once again in connection with FIG. 3, for a better understanding.

The aforementioned task is accomplished, according to the invention, according to claim 1, according to which a ray tracing method is used. The ray tracing method means that in the case of its implementation, at least part of the geometrical description of the world is intersected with rays, whereby the two-dimensional representation is put together from intersection points of objects of the world with the rays. Furthermore, several rays are brought together into a packet of discrete rays. In this connection, an association of a data structure with each packet of discrete rays then takes place. A status-related assignment to each ray is stored in memory for this data structure. This status indicates at least whether the indicated ray participates in the operation that is being applied to the packet at this time. Furthermore, the application of all work steps of the method to a packet of several discrete rays takes place. In this connection, in a work step that performs an operation on a packet, this operation is performed on every ray of the packet, if it results from the stored status-related assignment of the ray to the data structure that the ray in question participates in this operation. In this connection, the breakdown of the ray tracing method takes place to produce the following steps, which are worked off one after the other, in each instance, for a packet of rays:

A Camera ray generation: Generation of a packet of rays that are supposed to be intersected with the geometry of the three-dimensional world, proceeding from the virtual camera.

B Tree traversal: In accordance with the spatial orientation of the rays, the tree data structure for the geometry of the three-dimensional world is run through, until a tree leaf or a placeholder is reached. For this purpose, tree nodes and placeholders are read out of a memory, and calculations are carried out. If a placeholder is reached, the corresponding sequence of instructions of the substitute object is carried out. In this connection the placeholder is replaced with an object that can also be a complex one. In this connection, there are two alternatives available: Either the sequence of instructions is first carried out completely, and subsequently the method is continued in accordance with the new structure of the tree, or the sequence of instructions is carried out asynchronously, whereby the method is continued directly with the substitute of the placeholder, and when the sequence of instructions of the substitute object has been completely worked off, the substitute is replaced with the result of this work.

C Read-in of the tree leaf: All the references of the objects and placeholders that are located in this tree leaf are read in from a memory. If a placeholder is read in, in this connection, the corresponding sequence of instructions is carried out.

D Intersecting of all objects: Read-in and intersecting of all objects that were specified in work step C, with the packet of rays. If a transformation was specified for an object, this is applied before the intersection with the object is calculated. If a geometry-changing sequence of instructions was specified for an object, this is carried out before the intersection with the object is calculated. If an object to be intersected is a complex object with its own tree structure, which must be traversed, this object is intersected in that the work steps B-F, adapted to the complex object, are carried out.

E Intersection evaluation: Evaluation whether valid intersection points exist for the packet of rays. If there are still elements of the tree for which a ray intersection is possible, but which have not yet been examined, and the prior work step has not resulted in valid intersection points in a sufficient amount, then the method starts again at step B, including the previous results, otherwise it continues with step F. In this connection, the status of the packet is changed, if necessary.

F Determining the object properties: The results of the preceding work steps are evaluated. In this connection, data of objects can be read out of a memory, if these have a valid intersection point with one of the rays. The results of the calculations flow into step G, and if the results are appropriate, values in a memory can be recalculated. If a material-changing sequence of instructions was specified for one of the objects that were intersected by a ray, and if the material properties of this object are of significance for the work step F or G, this sequence of instructions is carried out ahead of the calculations of the work step F.

G Subsequent ray generation: If it is calculated in step F that one or more additional rays are supposed to be intersected with the geometry of the three-dimensional world, then corresponding packets of rays are calculated in this step, and the method starts again at step B for these rays. Otherwise, it starts again at step A, if additional camera rays still have to be generated for forming the two-dimensional representation.

With this, a method for forming a two-dimensional representation of a virtual three-dimensional world is described. In this connection, the three-dimensional world is specified according to the above definitions. The method is characterized by a new technique for data reduction, without having to perform unnecessary calculations. In this technique, individual rays are brought together into packets of rays, as was already described in Ingo Wald, Carsten Benthin, Markus Wagner, Phillip Slusallek: "Interactive Rendering with Coherent Ray-Tracing," Computer Graphics Forum/Proceedings of the EUROGRAPHICS 2001, Manchester, United Kingdom, Sep. 3-7, 2001, http://graphics.cs.uni-sb.dde/Publications/2001/InteractiveRenderingWithCoherentRayTracing.pdf.

A novel and inventive expansion as compared with the method described in the cited prior publication consists of the association of a data structure with each of these packets. In this connection, this data structure contains the status of each ray of a packet. Furthermore, the individual work steps of the ray tracing method are structured in such a manner that they optimally support the new technique, and at the same time are particularly suitable for being implemented in terms of equipment technology.

For clarification, reference is made to the following explanations, in connection with FIG. 3, in which it is explained how the calculation proceeds if the rays R1 and R2 are brought together into a packet.

In the working of the method, the possibility is offered of precisely assigning a packet to a work step, in order to thereby achieve a structured sequence.

A packet can also be assigned to several work steps at the same time, however, in order to thereby achieve a better capacity utilization of the data processing system. For example, the processing of rays for which valid intersection points were already calculated in step E could continue with step F, while the calculation is continued with step B for the other rays. As soon as all the rays of the packet have then carried out the calculations in step F, the packet could then continue as a whole again, with the processing of step G.

In the embodiment of the method according to claim 2, the rays generated in work step G are brought together in new packets by means of another work step. In this connection, all the newly generated rays are collected, sorted and compiled into new packets of discrete rays.

In this connection, a new packet does not necessarily contain only rays that were generated on the basis of the calculation results of precisely one predecessor ray packet, and instead, the work step can involve collecting and resorting newly generated rays of several predecessor ray packets that are logically related, to combine them into new packets.

In connection with claim 1, particularly also in the case of the explanations regarding FIG. 3, it was described how the effect of the data reduction during traversal of packets acts, and thereby results in a data reduction for the steps C (read-in of the tree leaf), D (intersecting of all objects) and E (intersection evaluation). This effect does not occur if the packers are disadvantageously compiled from rays.

If, for example, the ray R1 visits the tree components {N1, N2, V1} and the ray R3 visits the tree components {N3, V2}, traversal of the packets does not result in any data reduction as compared with traversal of the individual rays.

Here, claim 2 advantageously describes a work step that expands the method described in claim 1, and brings newly generated rays together in packets in such a manner that a data reduction is achieved in the traversal of the packets, as compared with traversal of the individual rays.

In the embodiment of the method according to claim 3, a multi-threading method is used, whereby a packet of rays is considered as a thread, in each instance.

The multi-threading method is used within a work step in order to allow functional units to perform useful work while they are waiting for results from other functional units. In this connection, each work step holds a supply of packets that are alternately worked off by the functional units of the work step.

In some work steps, data are loaded from a memory. Usually, loading of data from a memory takes several time units. However, since it is necessary to wait for the data to be loaded before the calculations can be carried out, this waiting time passes without the possibility of performing any useful calculations. If several packets are assigned to a work step at the same time, then the sequence of a calculation could look as follows:

It is calculated for packet 1 what datum is to be loaded from the memory. Afterwards, the datum is loaded for packet 1 and, at the same time, it is calculated for packet 2 what datum is to be loaded from the memory for packet 2. If the datum was then loaded from the memory for packet 1, the calculation for packet 1 can be carried out. At the same time, the corresponding datum is loaded from the memory for packet 2, and it is calculated for packet 3 what datum packet 3 would like to load from the memory, etc.

It is therefore advantageous, in connection with the method described, if a packet is classified as a thread.

According to claim 4, the method is configured in such a manner that the amount of the data of the three-dimensional world is managed in such a manner that only part of these data are held in the memory at a particular time.

In this connection, it is advantageous if the data of entire objects or entire partial objects are always loaded into the memory or removed from the memory, in order to create space for newly required (partial) objects. In this connection, the method can be structured in such a manner that an independent work step is implemented for this, in which it is recorded what (partial) objects were accessed and how often. Furthermore, in this work step, the collected information can be used in order to manage the memory automatically and to load new parts of the three-dimensional world into the memory and remove them, as needed.

A virtual world can therefore consist of a plurality of objects. In this connection, the description of the virtual world can contain so many data that it requires very much memory space. For example, in a data processing system, there are several memories of different sizes and speeds. Since large memories are generally significantly slower than smaller ones, but the speed of the memory plays an important role for the time required to work off the method, it is desirable to hold all of the data important for the method in a fast memory.

Using the method according to claim 4, it is therefore possible to organize a management of the different memories with which it can be achieved that all the data currently required are always kept available in a fast memory, if possible. For this purpose, the method records what objects or partial objects were read out when and how often, and loads new (partial) objects out of a slow memory into the fast memory as needed. If the fast memory is full, the method can find (partial) objects that are no longer required, on the basis of the bookkeeping, and delete them from the fast memory, so that room is created for the required data. It is also important, in this connection, that the method from one of claims 1, 2, or 3 accesses the data of the virtual world only to read them, and therefore the case that the data were changed in the fast memory and must be written back into the slow memory before they can be deleted can never occur.

It is also possible to organize the data and memory management in such a manner that blocks of data are always loaded into the memory or removed from the memory, in order to create space for newly required data. Here again, an independent work step can be implemented, in which it is recorded what blocks were accessed when and how often. Furthermore, in this work step, the collected data can be used in order to manage the memory automatically and to load new parts of the three-dimensional world into the memory or remove them, as needed.

In the case of this alternative, the difference as compared with the variant explained above, in connection with claim 4, is that it is not entire objects or partial objects that are read from the slow memory or deleted in the fast memory, but instead the data of the virtual world are divided into blocks, and these blocks are read into the fast memory or deleted from it as needed. In particular, an object can be broken down into several blocks by means of this subdivision. The advantage in this connection is that in the case of a fixed size of the blocks, the same number of data elements is always read out of or deleted from a memory. In the case of the method according to claim 4, the number of the read or deleted data elements can vary greatly with the object, in each instance.

Claim 5 relates to a device for implementing one of the aforementioned methods, whereby the individual work steps are represented by independent functional groups.

These functional groups therefore advantageously form closed units, which are expanded by such management functions that other similar units can be added to the system, and thereby an increase in the performance of the system can be achieved.

In this connection, the functional groups can be additionally equipped with management functions, so that several similar functional groups can be combined in a device, and thereby the performance capacity of the device can be increased. In order to achieve the result that an increase in the performance capacity of the device can be achieved by adding similar functional groups, the functional groups must be disposed in a suitable manner, so that the required calculation steps are uniformly distributed over all of the available units.

Aside from that, the functional groups can additionally use the pipelining method, in which several packets are in the method at the same time. In the pipelining method, individual packets are not calculated one after the other, but instead, several packets can be in the method sequence at the same time, in different work steps. For example, packet 1 can be generated in work step A. While the calculations for packet 1 are afterwards being carried out in work step B, packet 2 could be generated in step A. Once the calculation of packet 1 in step B is finished, packet 1 goes to work step C, and packet 2 can be processed in step B, while packet 3 is generated in step A, etc.

The pipelining method can also be used directly in connection with the multi-threading method. In this connection, every work step is then given a number of threads that are processed alternately by the step. After the processing of one thread in a work step has been completed, this thread is passed on to the next work step, and this step than carries out this thread together with those that have already been assigned to it, one after the other. The two methods together allow a very great capacity utilization of the functional units of a device.

Claim 6 relates to a device for implementing one of the aforementioned methods, whereby the individual method steps are brought together into functional groups, as follows:

- RGS: Comprises several functional units for the work steps A, F, and G, and expands them with units for the management of sub-units.
  - Master: Coordinates the work of the slave functional units.
  - Slave: Contains units for the work steps A, F, and G.
  - MemInt: Coordinates the access of slave units to the external memory.
- RTC: Comprises several functional units for the work steps B, C, D, and E.
  - Traversal: Functional unit that comprises the work steps B and E.
  - List: Functional unit for the work step C.
  - Intersection: Functional unit for the work step D.
- RTC-MI: Coordinates and regulates all accesses of the RTC units to external memory units.
  - T-SR: Coordinates the access of traversal units to the T-cache.
  - T-cache: Keeps book about preceding traversal accesses and tries to avoid new accesses, in that it re-uses the preceding results.
  - L-SR: Coordinates the access of list units to the L-cache.
  - L-cache: Analogous to the T-cache for list accesses.
  - I-SR: Coordinates the access of list units to the I-cache.
  - I-cache: Analogous to the T-cache for intersection accesses.
  - M-SR: Coordinates the access of cache units to the external memory.
  - MemCtrl: Passes the accesses on to the external memory responsible for them.

Figure 7:
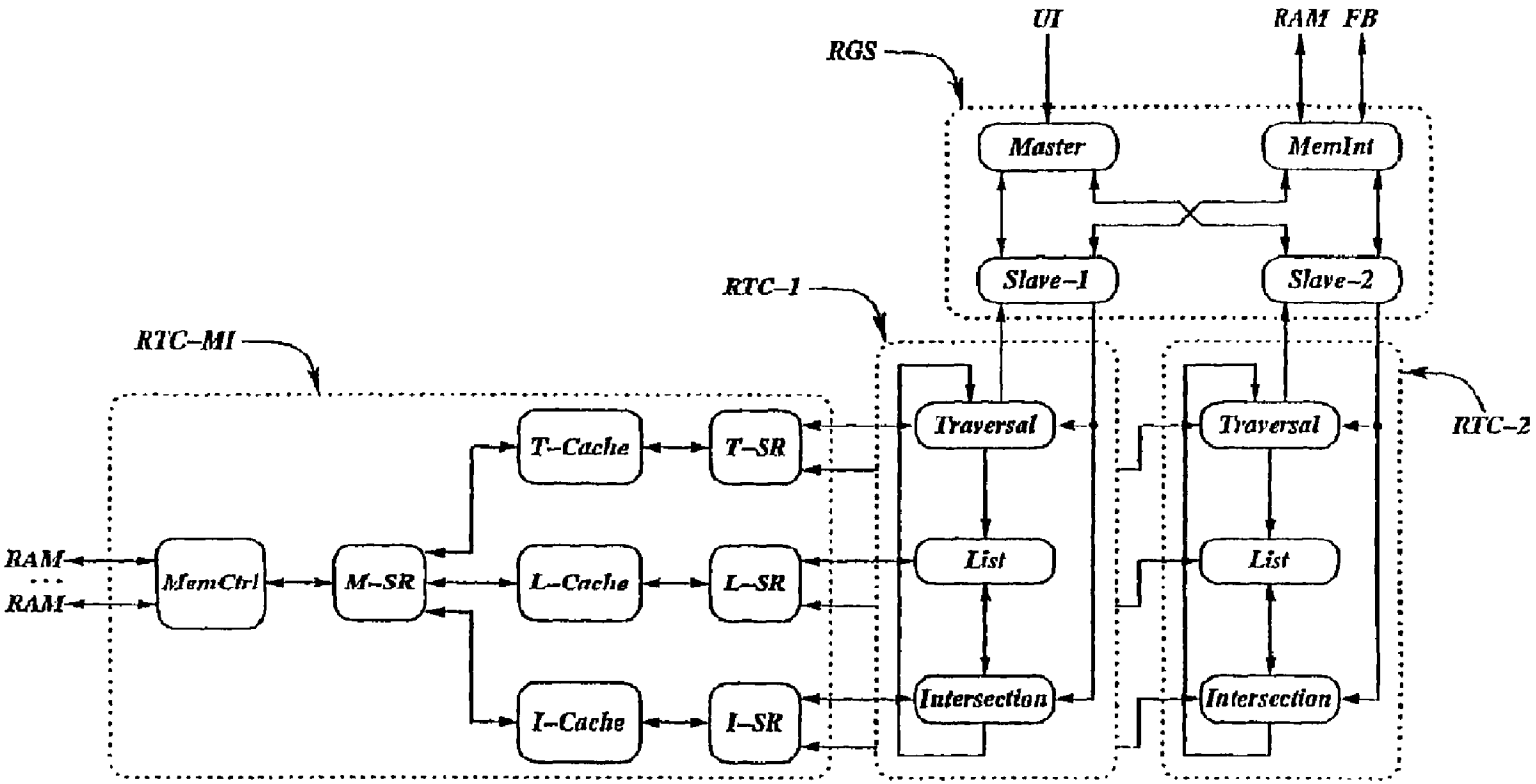

The functional groups are shown in FIG. 7.

In this connection, it is advantageous if the functional groups Slave, Traversal, and Intersection are structured in such a manner that they contain several sub-units, which perform calculations at the same time, and simultaneously keep a supply of packets available automatically, to which they apply the multi-threading method.

The functional units are structured in such a manner that the performance capacity of the device can be increased by adding additional similar groups. The number of slave functional units used is always precisely equal to the RTC functional groups (which consist of Traversal, List, and Intersection functional units). The functional units T-SR, L-SR, and I-SR are structured in such a manner that they can produce the connections between all of the RTC functional groups and the memories.

The Master functional unit is the highest controlling instance of the device. As input, it receives the parameters for the virtual camera (indicated with UI in the figure), and thereupon assigns descriptions of packets to one or more slave units. These perform the camera ray generation, using these descriptions, and send the calculated packets to the associated RTC unit.

The slave unit receives the data of the ray/object intersections as a response (some time later), and then performs the calculations for the work steps F and G. If subsequent rays are calculated, these are again sent to the associated RTC unit. In their calculations, the slave units must read data out of a memory and also write them back there, if applicable. The memory accesses of all the slave units are coordinated by the MemInt unit, which is connected with one or more memory modules (indicated with RAM in the figure).

If pixels or object values are calculated in work step F, then the slave units write to a special memory (indicated with FB in the figure), using the MemInt unit; they can also read data out of this memory again. This special memory could additionally be connected with a functional group that is connected to a monitor, in order to display the calculated two-dimensional representation.

The RTC functional group implements the working steps tree traversal, read-in of the tree leaf, intersecting all objects, and intersection evaluation. If a unit of the RTC group would like to load a datum out of the memory, it directs a corresponding request to the unit assigned to it, in other words to the T-SR unit, the L-SR unit, or the I-SR unit, respectively.

All of the memory requests from all of the RTC groups come together at the T-cache, L-cache, and I-cache units. These units have a data structure in which the data or prior memory requests are noted. If a request is made and its response from the memory was already noted, this request is answered with the datum from the data structure. In this connection, it is advantageous that all requests only want to read data from the memory. As a result, the content of the data structure can simply be deleted as needed, without having to write it back to the memory. This is of particular interest if the calculation for a new image is starting and objects have changed in this connection. In this case, a signal is sent to the T-cache, L-cache, and I-cache units, which delete the content of their data structure, so that in the case of a new request, the current object is read out of the memory. The (old) object noted in the data structure therefore does not flow into the new calculations by mistake.

The M-SR functional unit passes all requests from T-cache, L-cache, and I-cache on to the MemCtrl unit. MemCtrl is the functional unit that is directly connected to the memory module(s) (in the figure: RAM). In this connection, the MemCtrl functional group contains several mechanisms for avoiding possible waiting times that occur during access to the memory modules. These mechanisms include: address hashing, in order to distribute the requests uniformly among all the memory modules, and re-sorting of requests, so that waiting times caused by the internal structure of memory modules are avoided.

The breakdown of the method into device components, as described here, has the advantage that no functional group has to access data that are stored in another unit. As a result, the data can be stored predominantly locally, and it is not necessary to shift large amounts of data among the units, thereby greatly simplifying the implementation in terms of equipment technology.

Instead of integrating the functional group for implementing geometry-changing sequences of instructions into the Intersection functional group, it can also be switched between the M-SR and T-cache units. This offers the advantage that the sequences of instructions might be performed less frequently, since some of the results of these sequences of applications are noted in the data structure of the T-cache unit.

A practical expansion for the T-SR, L-SR, I-SR functional groups would be to equip them with a mechanism that brings similar requests that are made by different units at the same time together into one memory request, and sends the response of the memory back to all the requesters. In this connection, "at the same time" can also be interpreted as "within a short period of time." This mechanism can further reduce the number of memory requests.

A practical expansion for the T-cache, L-cache, and I-cache functional groups would be to equip them with lists in which all the requests that have already been passed on to the memory but whose result is not yet known are noted. If a request is now made that is already noted in the list, another note would simply be added to the list, but no request would be sent to the memory. If the response then comes from the memory, the datum would be reported as a response to all the requests, in accordance with the information in the list. This technique can further reduce the number of memory requests.

A device such as those described above could additionally be equipped with a functional group that automatically calculates the tree-like data structure for a number of objects. In this way, the device could react automatically to moving objects, for example.

Figure 2:
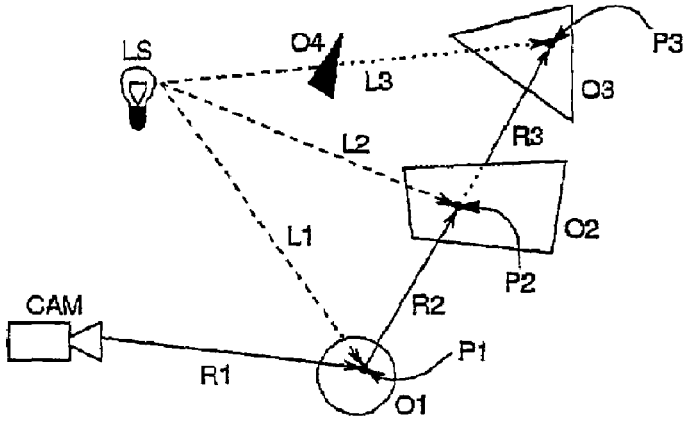
Figure 4:
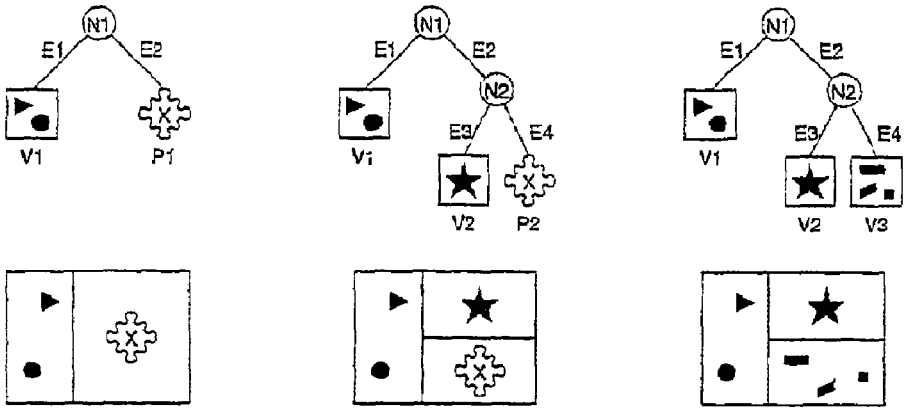
Figure 5:
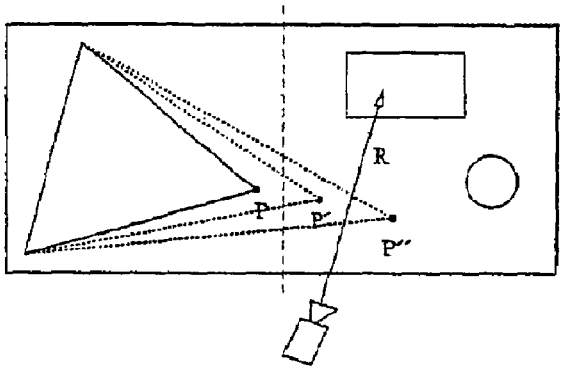
Figure 6:
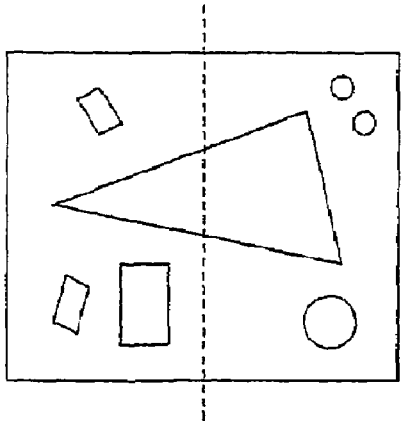

An exemplary embodiment of the invention is shown in greater detail in the drawing. This shows, in detail:

FIG. 1: an example to illustrate the fundamentals of the ray tracing method, FIG. 2: an example of implementation of the ray tracing method, FIG. 3: a representation to illustrate the definitions of terms, FIG. 4: a representation to explain the use of placeholders, FIG. 5: an example of a geometry-changing sequence of instructions, FIG. 6: the tree structure of a simple world, consisting of squares, triangles, and circles, and FIG. 7: a representation of functional groups in a device.

In connection with FIG. 1, the ray tracing method will be explained below. This can be used, for example, for the production of a two-dimensional representation, as follows: A paper divided with a pattern of small squares is held in front of the virtual camera and then a ray from the camera is sent through each of the small squares. If a ray hits an object, the corresponding small square is colored with the color of the object. Once this has taken place for all the small squares, the piece of paper contains a two-dimensional representation of what the virtual camera sees. If these small squares are made small enough, the representation loses its block-like character and becomes a high-resolution image. This subdivision into small squares is used in similar manner in the case of printers and monitors, where an image is composed of individual blocks, so-called pixels (English pixels). In the mathematical sense, "sending a ray into the world" takes place by means of intersecting the ray with all the or individually selected objects of this world. Here, an intersection of a ray with an object then either yields an intersection point on the surface of the object, or it does not.

FIG. 2 shows the calculations for a ray R1 that is sent into the virtual world by the virtual camera (CAM).

The ray R1 intersects the object O1 (a sphere) at the point P1. In the case of a simple variant of the ray tracing method, all that would be checked is the color that the object O1 possesses at the point P1, and then the corresponding pixel would be colored this color.

As possible expansions of this method, the lighting situation at the point P1 could be investigated. For this purpose, in a simple example, another ray L1 would be sent from a light source LS to the point P1. If the ray L1 does not intersect an object between LS and P1, there is no object that covers the light source, seen from the point P1, so that the light from LS arrives at the point P1 and illuminates it. In another case, that of a ray L3 from the light source LS to point P3, an object 04 lies in the virtual space, so that the point P3 lies in shadow.

In the case of another possible expansion, the material properties of the intersected object could be considered more closely. Assuming that object O1 has a reflective surface, in order to determine the color of the object O1 at the point P1, it would have to be checked what object is reflected at the point P1. In this case, as well, another ray R2, now proceeding from point P1, would be sent into the virtual world.

In our example of FIG. 2, R2 intersects the object O2 at the point P2. To determine the color in P2, the ray L2 is calculated. In this example, the object O2 is a pane of glass, so that in order to determine the color of the point P2, it must be determined what object can be seen through the pane of glass O2. For this purpose, the ray R3 is sent into the virtual world, proceeding from the point P2. The intersection point that results is the point P3 on the object O3. The lighting situation is also calculated for P3, in order to then be able to determine its color. The color for the pixel that belongs to ray R1 is then composed of the weighted colors at the points P1, P2, and P3.

In this example, six rays had to be calculated in order to determine the color of a single pixel. As a rule, high-resolution two-dimensional representations have several million pixels, so the calculation effort is correspondingly greater.

Another problem in the production of a two-dimensional representation of a three-dimensional virtual world is the complexity of this world. In FIG. 2, the world consists of the objects O1, O2, O3, and O4, as well as the light source (LS) and the virtual camera (CAM). When considering the ray R1, it can be seen that the ray intersects the object O1, if it intersects anything at all. For an automated device, it is not obvious that only object O1 is a possibility for an intersection. A method for an automated device would therefore have to intersect all the objects of the virtual world with the ray R1 in order to find out what object is impacted by the ray R1. Particularly if the virtual world consists of a large number of objects, very many calculations would have to be performed in order to produce a two-dimensional representation. To solve this problem, again several methods are known, in order to restrict the amount of objects to be intersected by means of logical decisions.

FIG. 3 shows an example for a data structure corresponding to the definitions of the introduction to the specification, on the left. In order to simplify the representation, a two-dimensional world was chosen for the example, which can be visualized as simply being a top view of a three-dimensional world. This world can be seen in the center of FIG. 3.

In this example, the node N1 forms the root of the tree. The partition plane (here also indicated with N1) described by the node N1 is also evident in the top view of the world. Simply stated, the plane described by N1 divides the world into a left half that contains the triangle, the sphere, and the placeholder (P1), and a right half that contains a star. Analogously, N2 and N3 divide the world into additional halves.

On the right in FIG. 3, two rays R1 and R2 are shown, which are supposed to be intersected with the world, proceeding from the virtual camera. The calculation for the ray R1 would proceed as follows for this example:

The ray R1 is compared with the partition plane N1. In this connection, it is determined that the ray crosses the partition plane from the left to the right, in other words it would first like to examine the left half and then the right half of the world. The information is stored in memory that the right half might also be interesting, but the evaluation in the left half is continued there with the node N2, starting by way of the edge E1. In this connection, it is then found that only the half with the leaf V1, which contains two objects, a triangle and a circle, is interesting for the ray. Now the ray R1 is intersected with these objects, and in this connection it is determined that the ray does not impact any of these objects. Therefore the evaluation proceeds with the noted right half of N1, in accordance with what was stored in memory. The evaluation is continued with the node N3, by way of the edge E2. The ray R1 would first like to go to the left half, and then possibly into the right half. In the left half, the leaf V2 does not contain any objects, so that the ray does not have to be intersected with any objects. Instead, the further evaluation takes place with the noted right half. This is where the leaf V3 is located, which contains a star. The intersection of R1 with the star yields an intersection point, thereby ending the calculation for R1.

The calculation for the ray R2 again begins with the node N1. There, it is decided that only the right half is interesting for the ray. The node N3 is located in the right half. A comparison between R2 and the plane N3 shows that only the left half is interesting for the ray. But since this half only contains the empty leaf V2, the calculation for the ray R2 is therefore finished, without the ray intersecting with an object.

This is particularly interesting because we have calculated the correct result ("The ray R2 does not intersect any object of the virtual world.") without calculating even a single intersection between the ray and an object.

The method of procedure described, in which a tree-like data structure is run through, is also called traversal (English traversal). The intersection of an object with a ray is referred to in English as intersection.

The above example has not yet clarified the question how the calculation is continued when a placeholder is reached, since this case has not occurred. If a ray were to branch off at the node N2 by way of the edge E4, to the placeholder P1, then the instructions belonging to P1 (which belong to the specifications of the virtual world) would be carried out. In a simple example, these instructions could generate a tree leaf that contains an object. This tree leaf would then replace the placeholder, and therefore the calculations would be continued for a tree leaf, as usual. The instructions of the placeholder could, however, also lead to the result that the placeholder is replaced with a complex tree structure, which in turn can contain leaves with objects and even new placeholders.

Alternatively to this, it will now be explained how the calculation takes place according to the present invention,. taking into consideration the fact that the rays are brought together in packets.

In the first step, the tree node N1 is loaded from a memory, and it is calculated for all the rays of the packet where, and if yes how, the partition plane N1 is crossed. In this connection, it is determined that ray R1 would first like to go into the left half and then into the right half of the world. Ray R2, on the other hand, would only like to go into the right half. The decision for the packet from this work step then looks as follows: It is noted in the statuses of the rays that ray R1 would like to go into both halves and ray R2 would only like to go into the right half. The packet thereupon visits the left half. According to the status, the ray R2 does not participate in the calculations that belong to the left half. These calculations take place analogous to the example described above. When the calculations for the left half are finished, no valid intersection point was found yet for the rays R1 and R2, therefore the packet continues its calculations with the right half. Again, both rays participate in these calculations, according to the statuses. In the calculations regarding the partition plane N3, it is determined that the ray R1 would first like to go into the half having the tree leaf V2 and then into the half having the tree leaf. The ray R2, on the other hand, would only like to go into the tree leaf V2. This result is noted in the statuses and the calculations are continued with the tree leaf. Since this leaf is empty, no intersections of objects with rays are carried out. Since the status of ray R2 indicates that it does not want to visit any further halves, the calculation for ray R2 is finished and the status of R2 is marked with "calculations finished." The calculations for the packet are continued with V3. Only R1, which is intersected with the star object, still participates in these calculations. This intersection yields a valid intersection point, and the status of R1 is also marked with "calculations finished." Therefore all of the statuses of the rays of the packet are marked with "calculations finished," so that the calculations for the packet are therefore finished.

The effect of the data reduction also becomes clear with this example. If the calculations are made for individual rays, each of the nodes being considered has to be loaded from the memory for each ray. If, however, entire packets of rays are traversed, each node being considered by one of the rays is loaded from the memory only once for the entire packet. In this example, the ray R1 considers the tree nodes and tree leaves {N1, N2, V1, N3, V2, V3} and the ray R2 considers the tree nodes and tree leaves {N1, N3, V2}. If the rays are traversed individually, data are loaded from the memory nine times. If the rays are brought together in a packet, the packet only visits the tree nodes and tree leaves {N1, N3, V1, N3, V2, V3} and data are loaded from the memory only six times.

The new type of data structure as compared with previously known methods fulfills the purpose of avoiding unnecessary calculations. Without this data structure, the objects triangle and circle in the leaf V1 would also be intersected with the ray R2, because no information would be available for a packet as to what rays of the packet would like to participate in the current calculation step, and thereby every ray would have to participate in all the calculations. While it is true that this would not result in errors, because such unnecessary intersections do not yield any valid intersection points, it does result in unnecessary calculation steps.

Although examples for the individual work steps of the ray tracing method were already given, the individual steps will be discussed again here, and in this connection it will be made clear to what extent this breakdown is novel and what advantages it offers.

A Camera ray generation: Generation of a packet of rays, which are supposed to be intersected with the geometry of the virtual world, proceeding from virtual camera. For example, a rectangular region of small squares on the page in front of the virtual camera could be combined in a group and all the rays that pass through these small squares could be brought together in a group.

B Tree traversal: In accordance with the spatial orientation of the rays, the tree data structure for the geometry of the three-dimensional world is run through, until a tree leaf or a placeholder is reached. For this purpose, tree nodes and placeholders are read out of a memory, and calculations are carried out. If a placeholder is reached, the corresponding sequence of instructions of the substitute object is carried out. In this connection, the placeholder is replaced with an object that can also be a complex one. In this connection, two alternatives are available: Either the sequence of instructions is first carried out completely, and subsequently, the method is continued in accordance with the new structure of the tree, or the sequence of instructions is carried out asynchronously, whereby the method is continued directly with the substitute of the placeholder, and when the sequence of instructions of the substitute object has been completely worked off, the substitute is replaced with the result of this work.

The use of placeholders, particularly the technique of the evaluation of placeholders as needed, which is shown here, is new in the sector of ray tracing. Here, the evaluation of placeholders as needed offers the possibility of specifying virtual worlds having millions of objects implicitly, by means of placeholders, and nevertheless requiring only little memory and computer effort for calculating the image, since only those parts of the virtual world for which the method has found out that they are relevant for the calculation of the image are included in the calculation.

C Read-in of the tree leaf: In a tree leaf, it is not the objects and placeholders themselves, but rather references to them that are stored in memory. An example will illustrate the advantage of this:

In FIG. 6, a simple world having squares, circles, and a triangle is shown. In order to restrict the required number of ray/object intersections, a tree structure is supposed to be generated here, as well. In this connection, it is obvious that no partition plane that divides the world into a left and a right half but does not at the same time divide an object into two halves can be determined. In this example, the plane divides the world into one half having squares and one half having circles, but also divides the triangle into two halves. On the other hand, however, it becomes clear that one would like to perform this partition: A ray that would like to traverse only the left or only the right half of the world only has to intersect four objects, whereas in the case of a non-divided world, seven object/ray intersections would have to be calculated. If the objects themselves were stored in tree leaves, all of the squares and the triangle would have to be stored in the left leaf, and all of the circles and the triangle would have to be stored in the right leaf. In other words the triangle would have to be stored twice. If, on the other hand, only the references to the objects are stored in tree leaves, the left and the right tree leaf simply reference the triangle, and the data of the triangle are stored in memory only once.

An expansion of the invention would consist, for example, of keeping a list, for every packet, of the objects that were already intersected with the packet. If the references to objects are loaded from a tree leaf, a comparison is made as to whether the object was already intersected, and if so, the intersection with the same object is not performed again. In this connection, however, it must be noted that possibly some rays that participate in the current object/ray intersection did not participate in the object/ray intersection that was entered into the list, and therefore the intersection now has to be carried out for these particular rays, after all. Another advantage of this referencing is presented here: An object, for example a car, is specified and stored in the memory. Then, two additional objects are defined, which function as containers, in each instance, and possess references to the car object and, in addition, a transformation matrix and a material-changing sequence of instructions. In this manner, it is possible to represent two cars of the same model, but with different colors and at different positions, without having to store the data of the car in the memory multiple times.

D Intersecting of all objects: In work step C, a number of references to objects was read in from a tree leaf. In this work step, the data of the referenced objects are read in and the rays of the packet that participate in the current operation are intersected with these objects.

If a transformation was specified for one of the objects, this is applied before the intersection is calculated. If the object is a simple object without its own tree structure, the object is transformed and the intersection is calculated. Otherwise, the rays are transformed and thereby adapted to the relative coordinate system of the object, before traversal of the tree of this object begins with work step B. If it was calculated whether any, and if so, what intersection points exist between the rays and the object, then the results and the rays are transformed back into the absolute coordinate system of the world.

If a geometry-changing sequence of instructions was specified for an object, this is carried out before the intersection with the object is calculated. This geometry-changing sequence of instructions can be implemented, for example, in order to model water surfaces. In this connection, one would specify an object that represents the water surface at a certain point in time, and specify a sequence of instructions for this, which deforms this object according to clock time, for example, in order to represent wave movements.

A tree structure that contains an object with a geometry-changing sequence of instructions should consider the possible effects of this sequence of instructions, since otherwise errors of the representation could occur. An example is shown in FIG. 5. Here, a geometry-changing sequence of instructions was specified for a triangle, which shifts the corner point P to the point P' and P", in accordance with clock time. The tree structure is now supposed to be such that the object is referenced in all the tree leaves in which it can maximally occur. Here, the triangle should therefore be referenced in the left tree leaf, and the sphere, the rectangle, and the triangle should be referenced in the right tree leaf. If a ray R were only intersected with the right half, and the triangle were not referenced there, an incorrect intersection point would be calculated for this ray at a certain clock time, namely the one with the rectangle instead of the one with the triangle.

The use of the transformation matrices was already proposed in Ingo Wald, Carsten Benthin, and Phillip Slusallek: "A Simple and Practical Method for Interactive Ray Tracing of Dynamic Scenes," Technical Report 2002-04, submitted for publication, http://graphics.cs.uni-sb.de/Publications/TR/2002/Dyn/DynamicRayTracing.pdf.

The use of geometry-changing sequences of instructions is new in connection with the ray tracing method being presented here.

E Intersection evaluation: In this work step, an evaluation takes place as to whether valid intersection points exist for the packet of rays. For example, in the preceding work step D, a ray can have been intersected with several objects, and these intersections can also have several intersection points as their result. A valid intersection point, in this connection, would be the intersection point that lies closest to the origin of the ray. If there are still elements of the tree for which a ray intersection is possible, but which have not yet been examined, and the prior work step has not resulted in valid intersection points in a sufficient amount, then the method starts again at step B, including the previous results, otherwise it continues with step F.

F Determining the object properties: The results of the preceding work steps are evaluated. In particular, the material properties of the objects for which a valid intersection point with one of the rays was calculated can be investigated. In this connection, it can be determined, for example, that an object possesses a reflective surface, and therefore a subsequent ray must be calculated in order to determine the color at the intersection point. Likewise, if the object is a globe of our world, for example, a map could also be read in, and it could be calculated what country or ocean the ray has intersected, in order to then determine the color at the intersection point from this.

If a material-changing sequence of instructions was specified for the intersected object, this is carried out. In this connection, the material-changing sequence of instructions can also be used to make a marbled object out of a colorless object, for example. In particular, the pattern of the marble can be calculated by means of the sequence of instructions specified for the object, so that the pattern is only implicitly indicated with a mathematical formula, and is only calculated if a ray hits the object.

If a geometry-changing sequence of instructions was specified for the intersected object, which also has an effect on this work step, then this is also carried out.

G Subsequent ray generation: If it is calculated in step F that one or more additional rays are supposed to be intersected with the geometry of the three-dimensional world, then corresponding packets of rays are calculated in this step, and the method starts again at step B. Otherwise, it starts again at step A, if additional camera rays still have to be generated for forming the two-dimensional representation.

Another example for the use of placeholders is shown in FIG. 4. Here, the world with the related tree structures can be seen, from left to right, in a time progression, as it is expanded or changed in the implementation of placeholder P1 or P2, respectively.

An example for the use of placeholders will be explained in the following: The virtual world comprises the buildings A and B. For the first image to be generated, the camera is located in building A, and building B cannot be seen by the camera. Therefore it is sufficient to specify building B by means of a simple placeholder. If the virtual camera leaves building A and approaches building B, then the sequence of instructions for the placeholder B is carried out with the first ray that hits the placeholder for building B during traversal. This sequence of instructions could now specify that building B is loaded from a memory medium and is supposed to be exchanged for the placeholder for building B.

If the breakdown of the virtual world into several placeholders is chosen advantageously, the amount of data that must be examined in the generation of the image can be greatly restricted.

Vice versa, a very powerful mechanism for data reduction can also be implemented by means of replacing partial trees and objects by means of placeholders.

The invention claimed is:

1. Method for determining a two-dimensional representation of a three-dimensional world, whereby the two-dimensional representation is specified at least by a geometric description, a tree structure for spatial division of the three-dimensional world, and the material properties of all the objects of this world, wherein a ray tracing method is used, whereby several rays are brought together into a packet of discrete rays, whereby an association of a data structure with each packet of discrete rays is carried out, whereby a status-related assignment of the data structure to each ray is stored in memory, whereby all of the following are applied to the packet(s) of the several discrete rays, in that in a work step that performs an operation on a packet, this operation is performed on every ray of the packet, if the status-related assignment is stored in the data structure assigned to the packet, that the ray in question participates in this operation, whereby the ray tracing method is broken down into the following work steps, which are worked off one after the other, for the individual packets of rays:

A Camera ray generation: A packet of rays is generated, which are supposed to be intersected with the geometry of the three-dimensional world, proceeding from the virtual camera, B Tree traversal: In accordance with the spatial orientation of the rays, the tree data structure for the geometry of the three-dimensional world is run through, until a tree leaf or a placeholder is reached, whereby in this manner, tree nodes and placeholders are read out of a memory, and calculations are carried out, whereby when a placeholder is reached, the corresponding sequence of instructions of the substitute object is carried out, in that the placeholder is replaced with an object that can also be a complex one, whereby if a placeholder is present, two alternatives are available:

First, the sequence of instructions is carried out completely, and subsequently, the method is continued in accordance with the new structure of the tree, or the sequence of instructions is carried out asynchronously, whereby the method is continued directly with the substitute of the placeholder, and when the sequence of instructions of the substitute object has been completely worked off, the substitute is replaced with the result of this work, C Read-in of the tree leaf: All the references of the objects and placeholders that are located in this tree leaf are read in from a memory, and carried out, if applicable, D Intersecting of all objects: All the objects that were specified in work step C are read in, and intersected with the packet of rays, whereby if a transformation was specified for an object, this is applied before the intersection with the object is calculated, whereby if a geometry-changing sequence of instructions was specified for an object, this is carried out before the intersection with the object is calculated, whereby if an object to be intersected is a complex object having its own tree structure, which must be traversed, this object is intersected in that the work steps B-F, adapted to the complex object, are carried out, E Intersection evaluation: It is checked whether valid intersection points exist for the packet of rays, hereby possible ray intersections are determined for elements of the tree for which a ray intersection is possible, but which have not yet been examined, if valid intersection points were not yet determined in a sufficient amount, in that the method starts again at step B, including the previous results, whereby in the case of a sufficient amount of determined ray intersections, the method continues with step F, F Determining the object properties: With evaluation of the results of the preceding work steps, data of objects with which valid intersection points were calculated, if there are any, are read out of the memory, whereby the results of the calculations flow into step G, whereby if the results are appropriate, values in a memory are recalculated, whereby in the case that a material-changing sequence of instructions was specified for one or more of the objects that were intersected by a ray, in such a manner that the material properties of this object are of significance for the work step F or G, this sequence of instructions is carried out ahead of the calculations of the work step F, G Subsequent ray generation: If it was calculated in step F that one or more additional rays are supposed to be intersected with the geometry of the three-dimensional world, then corresponding packets of rays are calculated in this step, and the sequence of the method starts again at work step B for these rays, whereby otherwise, it starts again at step A, if additional camera rays still have to be generated for forming the two-dimensional representation.

2. Method according to claim 1, wherein the rays generated in work step G are brought together in new packets by means of an additional work step, whereby all the newly generated rays are collected, sorted, and compiled into new packets of discrete rays.

3. Method according to claim 1, wherein a multi-threading method is used, in that a packet of rays is considered as a thread, in each instance.

4. Method according to claim 1, wherein the amount of the data of the three-dimensional world is managed in such a manner that only a part of these data is held in the memory at a particular time.

5. A device for implementing a method for determining a two-dimensional representation of a three-dimensional world, whereby the two-dimensional representation is specified at least by a geometric description, a tree structure for spatial division of the three-dimensional world, and the material properties of all the objects of this world, wherein a ray tracing method is used, whereby several rays are brought together into a packet of discrete rays, whereby an association of a data structure with each packet of discrete rays is carried out, whereby a status-related assignment of the data structure to each ray is stored in memory, whereby all of the following are applied to the packet(s) of the several discrete rays, in that in a work step that performs an operation on a packet, this operation is performed on every ray of the packet, if the status-related assignment is stored in the data structure assigned to the packet, that the ray in question participates in this operation, whereby the ray tracing method is broken down into the following work steps, which are worked off one after the other, for the individual packets of rays:

A Camera ray generation: A packet of rays is generated, which are supposed to be intersected with the geometry of the three-dimensional world, proceeding from the virtual camera, B Tree traversal: In accordance with the spatial orientation of the rays, the tree data structure for the geometry of the three-dimensional world is run through, until a tree leaf or a placeholder is reached, whereby in this manner, tree nodes and placeholders are read out of a memory, and calculations are carried out, whereby when a placeholder is reached, the corresponding sequence of instructions of the substitute object is carried out, in that the placeholder is replaced with an object that can also be a complex one, whereby if a placeholder is present, two alternatives are available:

First, the sequence of instructions is carried out completely, and subsequently, the method is continued in accordance with the new structure of the tree, or the sequence of instructions is carried out asynchronously, whereby the method is continued directly with the substitute of the placeholder, and when the sequence of instructions of the substitute object has been completely worked off, the substitute is replaced with the result of this work, C Read-in of the tree leaf: All the references of the objects and placeholders that are located in this tree leaf are read in from a memory, and carried out, if applicable, D Intersecting of all objects: All the objects that were specified in work step C are read in, and intersected with the packet of rays, whereby if a transformation was specified for an object, this is applied before the intersection with the object is calculated, whereby if a geometry-changing sequence of instructions was specified for an object, this is carried out before the intersection with the object is calculated, whereby if an object to be intersected is a complex object having its own tree structure, which must be traversed, this object is intersected in that the work steps B-F, adapted to the complex object, are carried out, E Intersection evaluation: It is checked whether valid intersection points exist for the packet of rays, hereby possible ray intersections are determined for elements of the tree for which a ray intersection is possible, but which have not yet been examined, if valid intersection points were not yet determined in a sufficient amount, in that the method starts again at step B, including the previous results, whereby in the case of a sufficient amount of determined ray intersections, the method continues with step F, F Determining the object Properties: With evaluation of the results of the preceding work steps, data of objects with which valid intersection points were calculated, if there are any, are read out of the memory, whereby the results of the calculations flow into step G, whereby if the results are appropriate, values in a memory are recalculated, whereby in the case that a material-changing sequence of instructions was specified for one or more of the objects that were intersected by a ray, in such a manner that the material properties of this object are of significance for the work step F or G, this sequence of instructions is carried out ahead of the calculations of the work step F, G Subsequent ray generation: If it was calculated in step F that one or more additional rays are supposed to be intersected with the geometry of the three-dimensional world, then corresponding packets of rays are calculated in this step, and the sequence of the method starts again at work step B for these rays, whereby otherwise, it starts again at step A, if additional camera rays still have to be generated for forming the two-dimensional representation, wherein the individual work steps are represented by independent functional groups.

6. A device for implementing a method for determining a two-dimensional representation of a three-dimensional world, whereby the two-dimensional representation is specified at least by a geometric description, a tree structure for spatial division of the three-dimensional world, and the material properties of all the objects of this world, wherein a ray tracing method is used, whereby several rays are brought together into a packet of discrete rays, whereby an association of a data structure with each packet of discrete rays is carried out, whereby a status-related assignment of the data structure to each ray is stored in memory, whereby all of the following are applied to the packet(s) of the several discrete rays, in that in a work step that performs an operation on a packet, this operation is performed on every ray of the packet, if the status-related assignment is stored in the data structure assigned to the packet, that the ray in question participates in this operation, whereby the ray tracing method is broken down into the following work steps, which are worked off one after the other, for the individual packets of rays:

A Camera ray generation: A packet of rays is generated, which are supposed to be intersected with the geometry of the three-dimensional world, proceeding from the virtual camera, B Tree traversal: In accordance with the spatial orientation of the rays, the tree data structure for the geometry of the three-dimensional world is run through, until a tree leaf or a placeholder is reached, whereby in this manner, tree nodes and placeholders are read out of a memory, and calculations are carried out, whereby when a placeholder is reached, the corresponding sequence of instructions of the substitute object is carried out, in that the placeholder is replaced with an object that can also be a complex one, whereby if a placeholder is present, two alternatives are available:

First, the sequence of instructions is carried out completely, and subsequently, the method is continued in accordance with the new structure of the tree, or the sequence of instructions is carried out asynchronously, whereby the method is continued directly with the substitute of the placeholder, and when the sequence of instructions of the substitute object has been completely worked off, the substitute is replaced with the result of this work, C Read-in of the tree leaf: All the references of the objects and placeholders that are located in this tree leaf are read in from a memory, and carried out, if applicable, D Intersecting of all objects: All the objects that were specified in work step C are read in, and intersected with the packet of rays, whereby if a transformation was specified for an object, this is applied before the intersection with the object is calculated, whereby if a geometry-changing sequence of instructions was specified for an object, this is carried out before the intersection with the object is calculated, whereby if an object to be intersected is a complex object having its own tree structure, which must be traversed, this object is intersected in that the work steps B-F, adapted to the complex object, are carried out, E Intersection evaluation: It is checked whether valid intersection points exist for the packet of rays, hereby possible ray intersections are determined for elements of the tree for which a ray intersection is possible, but which have not yet been examined, if valid intersection points were not yet determined in a sufficient amount, in that the method starts again at step B, including the previous results, whereby in the case of a sufficient amount of determined ray intersections, the method continues with step F, F Determining the object properties: With evaluation of the results of the preceding work steps, data of objects with which valid intersection points were calculated, if there are any, are read out of the memory, whereby the results of the calculations flow into step G, whereby if the results are appropriate, values in a memory are recalculated, whereby in the case that a material-changing sequence of instructions was specified for one or more of the objects that were intersected by a ray, in such a manner that the material properties of this object are of significance for the work step F or G, this sequence of instructions is carried out ahead of the calculations of the work step F, G Subsequent ray generation: If it was calculated in step F that one or more additional rays are supposed to be intersected with the geometry of the three-dimensional world, then corresponding packets of rays are calculated in this step, and the sequence of the method starts again at work step B for these rays, whereby otherwise, it starts again at step A, if additional camera rays still have to be generated for forming the two-dimensional representation;

wherein the work steps are brought together in functional groups, as follows:

RGS: Comprises several functional units for the work steps A, F, and G, and expands them with units for the management of sub-units;

Master: Coordinates the work of the slave functional units;

Slave: Contains units for the work steps A, F, and G;

MemInt: Coordinates the access of slave units to the external memory;

RTC: Comprises several functional units for the work steps B, C, D, and E;

Traversal: Functional unit that comprises the work steps B and E;

List: Functional unit for the work step C;

Intersection: Functional unit for the work step D;

RTC-MI: Coordinates and regulates all accesses of the RTC units to external memory units;

T-SR: Coordinates the access of traversal units to the T-cache;

T-cache: Keeps book about preceding traversal accesses and tries to avoid new accesses, in that it re-uses the preceding results;

L-SR: Coordinates the access of list units to the L-cache;

L-cache: Analogous to the T-cache for list accesses;

I-SR: Coordinates the access of list units to the I-cache;

I-cache: Analogous to the T-cache for intersection accesses;

M-SR: Coordinates the access of-cache units to the external memory;

MemCtrl: Passes the accesses on to the external memory responsible for them.

*7. A method comprising:*

*generating computationally, by a computing device, one or more rays from a viewing point for generating an image for a three-dimensional space containing one or more objects, wherein the space is represented by a tree data structure, the tree data structure containing one or more first tree nodes and also comprising one or more tree leaves which are placeholders, and the respective placeholders comprising respective sequences of one or more instructions specifying respective substitute objects for the respective placeholders, the respective substitute objects including respective tree nodes to be substituted for the placeholders in the tree data structure;*

*traversing, by the computing device, the tree data structure to determine one or more leaves representing spaces intersected by one or more rays;*

*upon traversing a leaf in the tree data structure which is a placeholder, executing, by the computing device, the sequence of one or more instructions the placeholder comprises to create the substitute object for the leaf, including creating a new tree node and substituting the new tree node for the leaf which is a placeholder in the tree data structure; and*

*intersecting, by the computing device, the one or more rays with the substitute object.*

*8. The method of claim 7, wherein creating a substitute object further comprises creating a tree leaf for the tree data structure, which contains an object.*

*9. The method of claim 7, wherein creating a substitute object further comprises creating an object tree data structure containing one or more tree nodes and one or more tree leaves.*

*10. The method of claim 9, further comprising:*

*transforming by the computing device, the one or more rays into a relative coordinate system for the object tree structure; and*

*intersecting by the computing device, the one or more transformed rays with objects in the object tree structure.*

*11. The method of claim 7, further comprising displaying or causing to be displayed, by the computing device, the substitute object intersected with the one or more rays in the image.*

*12. A system comprising:*

*storage memory storing a tree data structure representing the three-dimensional space containing one or more objects for generating an image for the three-dimensional space and containing tree leaves and tree nodes, wherein one or more portions of the space are represented by tree leaves in the tree and one or more tree leaves in the tree comprise respective placeholders, the placeholders comprising respective sequences of one or more instructions specifying respective substitute objects for the respective placeholders, the respective substitute objects including respective tree nodes to be substituted for the placeholders in the tree data structure;*

*a computer processor coupled to the storage memory, the computer processor configured to computationally:*

*generate one or more rays from a viewing point;*

*traverse the tree data structure to determine one or more leaves representing spaces intersected by one or more rays;*

*upon traversing a leaf in the tree which is a placeholder, execute the sequence of one or more instructions the placeholder comprises to create the substitute object for the leaf, including creation of a new tree node and substituting the new tree node for the leaf which is a placeholder in the tree data structure;*

*intersect the one or more rays with the substitute object.*

*13. The system of claim 12, wherein the computer processor is further configured to cause to be displayed the substitute object intersected with the one or more rays in the image.*

*14. The system of claim 12, wherein the computer processor is configured to create a substitute object through creation of a tree leaf for the tree data structure, which contains an object.*

*15. The system of claim 12, wherein the computer processor is configured to create a substitute object through creation of an object tree data structure containing one or more tree nodes and one or more tree leaves.*

*16. The system of claim 15, wherein the computer processor is further configured to:*

*transform the one or more rays into a relative coordinate system for the object tree structure; and*

*intersect the one or more transformed rays with objects in the object tree structure.*

* * * * *

UNITED STATES PATENT AND TRADEMARK OFFICE

CERTIFICATE OF CORRECTION

PATENT NO. : RE44,347 E
APPLICATION NO. : 12/608864
DATED : July 9, 2013
INVENTOR(S) : Schmittler et al.

It is certified that error appears in the above-identified patent and that said Letters Patent is hereby corrected as shown below:

On the Title Page

On Page 2, in Item (56), under "OTHER PUBLICATIONS", in Column 1, Line 42, delete "Report)Line." and insert -- Report). --, therefor.

On Page 2, in Item (56), under "OTHER PUBLICATIONS", in Column 1, Lines 47-49, delete "Watt: A.: "3D Computer Graphics" 2000, Addison-Wesley, Harlow, England XP002269804 Kapitol 12, p. 358, Line 16, pp. 365, line 4 (International Search Report)Line.".

On Page 2, in Item (56), under "OTHER PUBLICATIONS", in Column 2, Lines 60-64, delete "Ingo Wald, Carsten Benthin and Phillip Slusallek: "A Simple and Practical Method for Interactive Ray Tracing of Dynamic Scenes," Technical Report Apr. 2002, submitted for publication, http://graphics.cs.uni-sb.de/Publications/TR/2002/Dyn/DynamicRay/Tracing.pdf. (German Priority Document & Spec) Enclosed.".

On Page 2, in Item (56), under "OTHER PUBLICATIONS", in Column 2, Lines 65-70, delete "Wald I et al: "Interactive Rendering with Coherent Ray Tracing" European Association for Computer Graphics. 22nd Annual Conference Eurographics 2001, Manchester Uk, Sep. 4-7, 2001, vol. 20, No. 3, pp. C/53-64, XP002269801 Computer Graphics Forum, 2001, Blackwell Publishers for Eurograpean Assoc, UK ISSN: 0167-7055 (International Search Report).".

In the Specification

In Column 4, Line 43, delete "http://graphics.cs.uni-sb.dde/Pub-" and insert -- http://graphics.cs.uni-sb.de/Pub- --, therefor.

In Column 5, Line 20, delete "packers" and insert -- packets --, therefor.

Signed and Sealed this
Thirteenth Day of May, 2014

Michelle K. Lee

Michelle K. Lee
*Deputy Director of the United States Patent and Trademark Office*

In Column 11, Line 60, delete “invention,.” and insert -- invention, --, therefor.

In the Claims

In Column 20, Line 36, in Claim 6, delete “of-cache” and insert -- of cache --, therefor.